(12) United States Patent
Urakawa

(10) Patent No.: US 11,782,568 B2
(45) Date of Patent: Oct. 10, 2023

(54) IMAGE PROCESSING SYSTEM

(71) Applicant: Brother Kogyo Kabushiki Kaisha, Nagoya (JP)

(72) Inventor: Yutaka Urakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 46 days.

(21) Appl. No.: 17/398,192

(22) Filed: Aug. 10, 2021

(65) Prior Publication Data
US 2022/0066619 A1    Mar. 3, 2022

(30) Foreign Application Priority Data
Aug. 31, 2020  (JP) .................. 2020-145537

(51) Int. Cl.
*G06F 3/04812*  (2022.01)
*H04N 1/00*  (2006.01)
*G06T 13/80*  (2011.01)

(52) U.S. Cl.
CPC .......... *G06F 3/04812* (2013.01); *G06T 13/80* (2013.01); *H04N 1/00424* (2013.01); *H04N 1/00442* (2013.01); *H04N 1/00506* (2013.01)

(58) Field of Classification Search
CPC ................. G06F 3/04812; G06T 13/80; H04N 1/00424; H04N 1/00442; H04N 1/00506
See application file for complete search history.

(56) References Cited

U.S. PATENT DOCUMENTS

2012/0236013 A1*  9/2012  Wyatt ................... G06F 1/3265
345/522
2019/0163413 A1*  5/2019  Suzuki .................. G06F 3/1259

FOREIGN PATENT DOCUMENTS

JP    2020-010265 A    1/2020

* cited by examiner

*Primary Examiner* — Robert J Michaud
(74) *Attorney, Agent, or Firm* — BURR PATENT LAW, PLLC

(57) ABSTRACT

According to aspects of the present disclosure, when a PC and a MFP are remotely connected through an network IF, a CPU of the MFP selects still images, which constitutes an animation, one by one and display the animation on a panel of the MFP by displaying the selected one image with sequentially switching the selected one image. Then, in a case where the same animation is continuously displayed on the panel of the MFP, after generating a plurality of pieces of screen data, which constitute the animation, to be displayed on the PC, the CPU of the MFP stops to repeatedly generate screen data same as the plurality of pieces of screen data.

8 Claims, 14 Drawing Sheets

IMAGE PROCESSING SYSTEM

CROSS-REFERENCE TO RELATED APPLICATIONS

This application claims priority under 35 U.S.C. § 119 from Japanese Patent Application No. 2020-145537 filed on Aug. 31, 2020. The entire subject matter of the application is incorporated herein by reference.

BACKGROUND

Technical Field

Aspects of the present disclosures relate to a technology of remotely operating an image processing device from an information processing terminal.

Related Art

There has been known an image forming system in which, when an image processing device and an information processing terminal are remotely connected, the information processing terminal obtains screen data from the image processing device and displays the same so that the same display content is displayed on both the information processing terminal side and the image processing device side.

SUMMARY

However, in the system described above, when an animation is being displayed on the image processing device side, the image processing device needs to repeatedly generate screen data of still images that constitute the animation at short time intervals and transmits the same to the information processing terminal, which increases the load to the CPU of the image processing device. As a result, the animation may not move as it should, or the response to the request from the information processing terminal to obtain the screen data may be delayed.

According to aspects of the present disclosures, there is provided an image processing system including an information processing device and an image processing device. The information processing device comprises a first communication interface, a first display, and a first controller, and the image processing device comprises a second communication interface, a second display, and a second controller. In a case where the image processing device and the information processing device are remotely connected through the first communication interface and the second communication interface, the first controller is configured to periodically transmit a screen update request to the image processing device, the screen update request being a request for screen data, the screen data being used to display a virtual same screen on the first display, the virtual same screen being a screen same as a screen displayed on the second display, and receive the screen data transmitted by the image processing device in response to the screen update request, and display, on the first display, the virtual same screen based on the received screen data. In a case where the image processing device and the information processing device are remotely connected through the first communication interface and the second communication interface, the second controller is configured to, in response to receipt of the screen update request from the information processing device, generate the screen data and transmit the generated screen data to the information processing device, and, in a case where, after displaying an animation on the second display by selecting images, one by one, from a plurality of still images constituting the animation and displaying the selected images by switching the selected images sequentially, when an animation same as the animation displayed on the second display is to be displayed continuously, after generating a plurality of pieces of screen data used to display the plurality of still images, respectively, stop generating screen data same as the plurality of pieces of screen data.

DETAILED DESCRIPTION OF THE EMBODIMENT

Hereinafter, an embodiment according to aspects of the present disclosures will be described with reference to the drawings.

Figure 1:
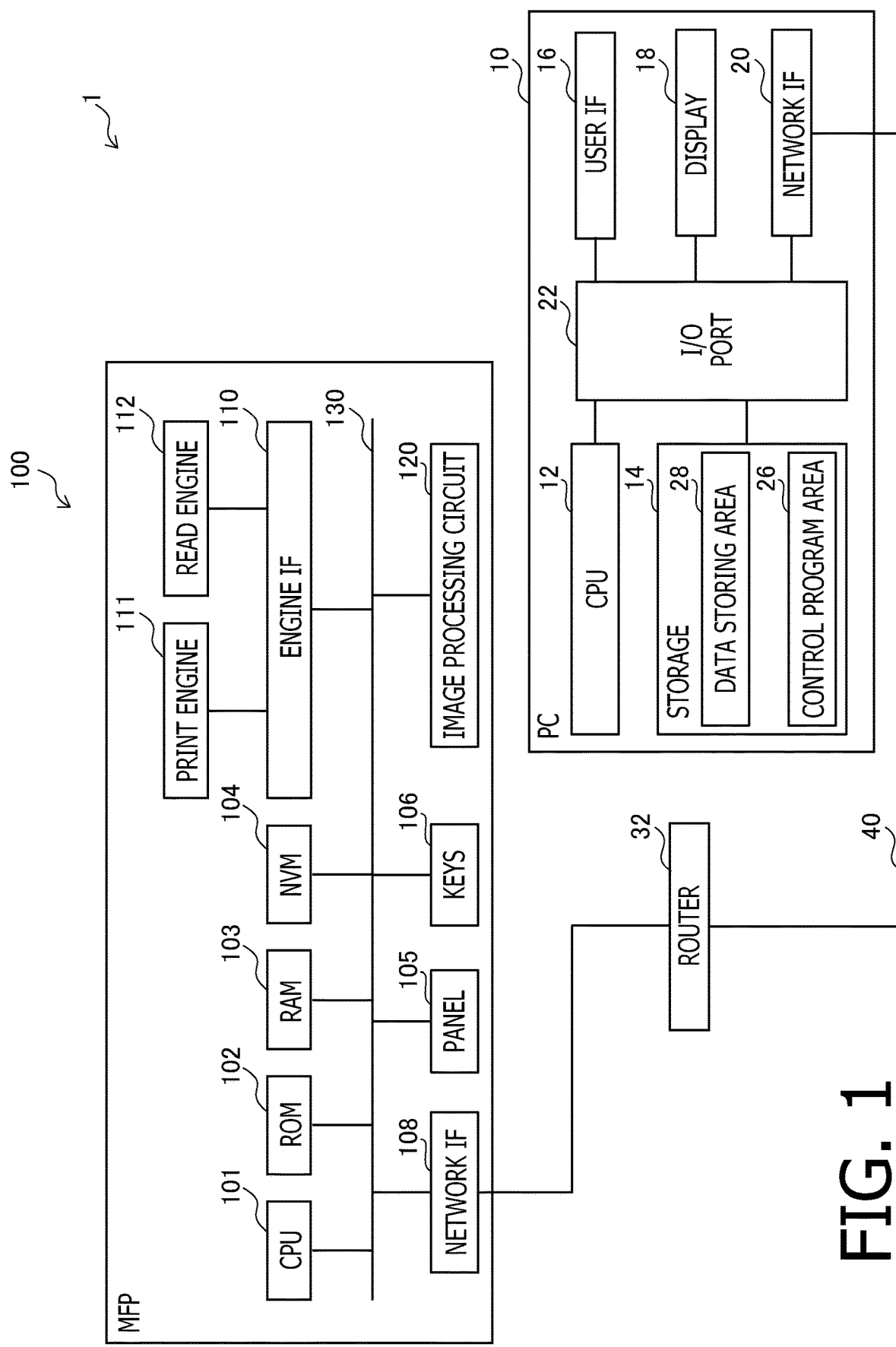
FIG. 1 is a block diagram of a control structure of an image processing system including a PC (personal computer) and an MFP (multi-function peripheral) according to aspects of the present disclosures.

FIG. 1 shows a control configuration of an image processing system 1 according to an embodiment of the present disclosures. The image processing system 1 is equipped with a PC 10, an MFP 100, and a router 32. It is noted that "MFP" is an abbreviation for a multi-function peripheral.

The PC 10 is mainly equipped with a CPU 12, a storage 14, a user IF 16, a display 18, and a network IF 20, which are configured to communicate with each other via an input/output (I/O) port 22. It is noted that "IF" is an abbreviation for an interface.

The user IF 16 typically includes a keyboard and a mouse.

The display 18 includes a displaying device, such as a liquid crystal display or organic EL display, and a drive circuit to drive the displaying device. When a touch panel system is used as the display 18, the user can perform input operations by touching the input buttons on the screen (i.e., the touch panel). Therefore, in such a case, the display 18 also serves as the user IF 16.

The CPU 12 executes various application programs (hereinafter referred to as "applications"), firmware and the like, including a program for a main process which will be described below referring to FIGS. 6A and 6B.

The storage 14 includes a ROM, a RAM, an HDD, an SSD, an optical disc drive and the like. A data storage area 28 of the storage 14 is an area where the CPU 12 stores data necessary for executing the program for the main process program and other programs. A control program area 26 of the storage 14 is an area for storing an OS, the program for the main process, and various other applications and firmware.

The network IF 20 is configured to connect the PC 10 to a communication network 40. The communication network 40 is a wired or wireless LAN. The network IF 20 is either a LAN IF or a WLAN IF, or both. In this embodiment, since a router 32 and the MFP 100 are connected to the communication network 40, the PC 10 can transmit and receive various data to and from the MFP 100 via the router 32.

The MFP 100 is mainly equipped with a CPU 101, a ROM 102, a RAM 103 and an NVM 104. It is noted that "NVM" is an abbreviation for a non-volatile memory.

The CPU 101 is configured to control the entire operation of the MFP 100, and control a print engine 111 and a read engine 112 via an engine IF 110, respectively.

The ROM 102 is a memory configured to store a control program (including the main process program described below referring to FIG. 10) to be executed by the CPU 101. The CPU 101 is configured to retrieve a control program stored in the ROM 102 and execute various processes. The RAM 103 is a memory for temporarily storing image data and the like. The RAM 103 is also used as a storage area for temporarily storing data, signals and the like which are used by the CPU 101 in executing the control program, or as a work area for data processing. The NVM 104 is a non-volatile memory for storing setting information and the like.

The MFP 100 is equipped with a panel 105 and keys 106. The panel 105 is a touch panel according to the present embodiment, and various screens are displayed on the panel 105 according to a state of the MFP 100. A user of the MFP 100 can perform input operations by touching the input buttons on the screen. In the present disclosures, an operation of "touching the input buttons on the screen" may also be referred to as an operation of "pressing the input buttons on the screen." The key 106 is a hard key, that is, a key formed by hardware. A power switch, a reset switch, numeric keys and the like are examples of the keys 106.

Further, the MFP 100 has a network IF 108 which is similar to the network IF 20 of the PC 10. Accordingly, the MFP 100 is capable of transmitting and receiving various data from the PC 10 as described above.

The MFP 100 is also equipped with an engine IF 110. A printing engine 111 and a reading engine 112 are connected to the engine IF 110. The printing engine 111 is a device configured to print an image on a sheet, and has a printing device such as an electrophotographic, inkjet or thermal printing device, or the like. The reading engine 112 is a device configured to read images formed on a document, and has a reading device such as a CCD, a CIS or the like. The engine IF 110 is an interface configured to control the printing engine 111 and the reading engine 112.

The MFP 100 is further equipped with an image processing circuit 120. The image processing circuit 120 is configured to rasterize the image data of a print job and output the image data to the printing engine 111. The image processing circuit 120 is also configured to process the image data read from the document by the reading engine 112 into digital data. The image data processed into the digital data is transmitted externally via the network IF 108 or supplied to the printing engine 111 for output on sheets.

The CPU 101, the ROM 102, the RAM 103, the NVM 104, the panel 105, the keys 106, the USB IF 107, the network IF 108, the engine IF 110 and the image processing circuit 120 are interconnected via a bus 130.

Figure 2A:
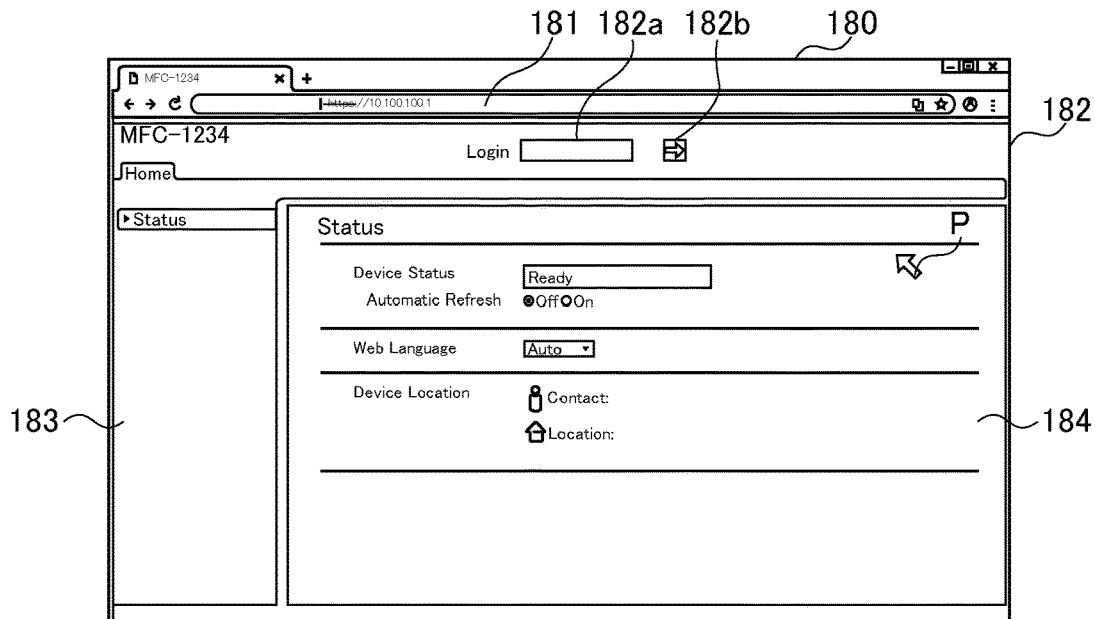
FIGS. 2A and 2B show examples of a display screen displayed on a browser running on the PC shown in FIG. 1.

FIG. 2A shows an example of the browser screen 180 displayed on the display 18 when the user of the PC 10 starts the browser on the PC 10 and enters the URL "10.100.100.1" in the URL input field 181. The entered URL "10.100.100.1" indicates a location where an EWS, one of the control programs of the MFP 100, is stored. The term "EWS" is an abbreviation for embedded web server.

In a page display area 182 of the browser screen 180, a page provided by the EWS is displayed. The page provided by the EWS includes an item pane 183 and a detail pane 184. The page shown in FIG. 2A is an initial page provided by the EWS. When the user of PC 10 enters a password in a login password entry field 182a in this initial page, indicates the login button 182b with a mouse pointer P, and clicks on the login button 182b with the mouse, the user can access a function settings page, provided by the EWS, for setting respective functions of the MFP 100.

Figure 2B:
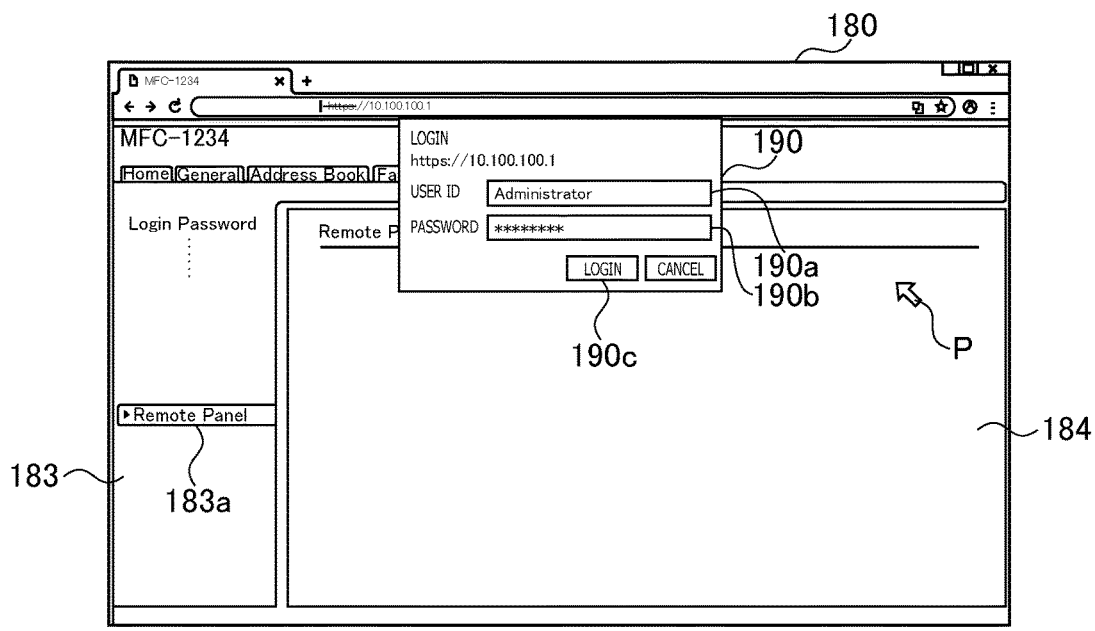

FIG. 2B shows an example of a browser screen 180 that is displayed when a "Remote Panel" item 183a is clicked among the multiple items listed in the item pane 183 on the function setting page. The "Remote Panel" item 183a is an item used to display the "Remote Panel" in the detail pane 184. On the browser screen 180 of the example shown in FIG. 2B, a login authentication screen 190 is popped up for performing authentication of the user with respect to the "Remote Panel." It is noted that the login authentication is performed before displaying the "Remote Panel" for the following reasons.

It is noted that the "Remote Panel" is a virtual screen that is generated and displayed as a virtual display of the panel of the device to remotely access a remotely connected device. Inputting an operation to the "Remote Panel" displayed in the detail pane 184 results in the same operation input to the device to be remotely accessed, which is the panel 105 of the MFP 100 in this embodiment. When the "Remote Panel" is displayed on the PC 10, any person can freely and remotely access the MFP 100 from outside via the PC 10. Therefore, it is necessary to restrict the users who can view the "Remote Panel." Therefore, even after logging into the function setting page, further login authentication is required to display the "Remote Panel."

Figure 2C:
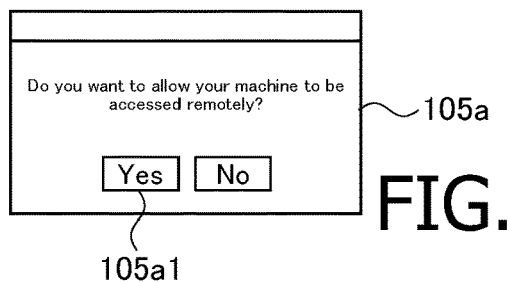
FIG. 2C is a screen displayed on a panel of the MFP shown in FIG. 1.

The logging into the "Remote Panel" is limited to users having administrative privileges (hereinafter referred to as "administrators"). Firstly, the user enters an administrator name in a user name input field 190a in the login authentication screen 190, and enters an administrator password in a password input field 190b. Then, when the user clicks the login button 190c with the mouse, a confirmation screen 105a is displayed on the panel 105 of the MFP 100 to ask whether the remote operation of the MFP 100 is to be permitted, as shown in FIG. 2C. When the user of the MFP 100 presses a "Yes" button 105$a1$ on the confirmation screen 105$a$, the term "Remote Panel" is displayed on the detail pane 184.

Figure 3:
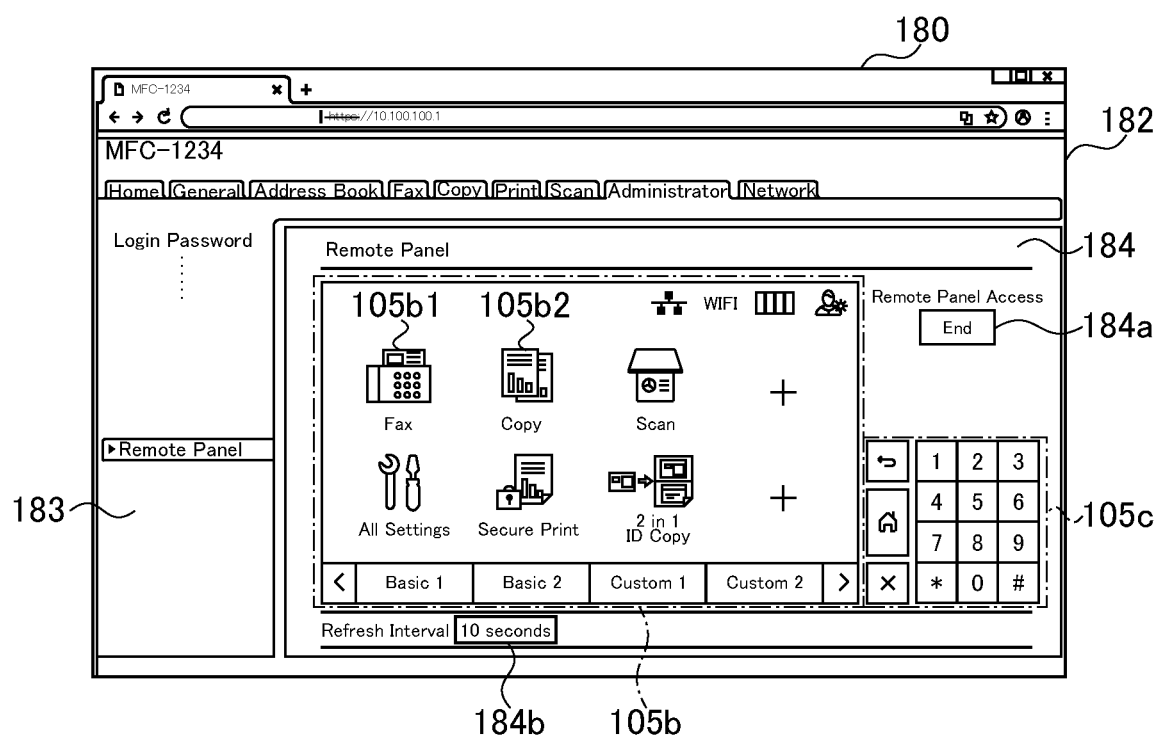
FIG. 3 shows an example of a display screen after the display screen of the browser shown in FIG. 2 is transited.

FIG. 3 shows an example of the "Remote Panel" displayed on the detail pane 184. The "Remote Panel" which is the example shown in FIG. 3 includes the panel display 105$b$ displayed on the panel 105 of the MFP 100 as well as the key display 105$c$ that virtually displays the keys 106 of the MFP 100. The screen data for displaying the "Remote Panel" is obtained from the EWS. Since the EWS is software as described above, an expression of "obtaining from the EWS" specifically means that the CPU 101 of the MFP 100 obtains from the MFP 100 by executing the software of the EWS. However, such a situation may be simply expressed such that the screen data is "obtained from the EWS."

A "Refresh Interval" selection field 184$b$ is also displayed on the "Remote Panel." The "Refresh Interval" selection field 184$b$ is used to select an interval at which the screen data for displaying the "Remote Panel" is obtained from the EWS. In the example shown in FIG. 3, an interval of "ten seconds" is selected. In other words, the PC 10 outputs a request for obtaining the screen data to the EWS at ten-second intervals even when there is no user operation of the "Remote Panel."

In the "Remote Panel," there is also a termination button 184$a$ to terminate the "Remote Panel." The administrator can terminate the "Remote Panel" by clicking on the termination button 184$a$.

FIGS. 4A through 4D show examples of panel displays 105$d$ through 105$e'$ which are displayed on the panel 105 of the MFP 100, and in particular, concrete examples of animations displayed on the panel 105.

Figure 4A:
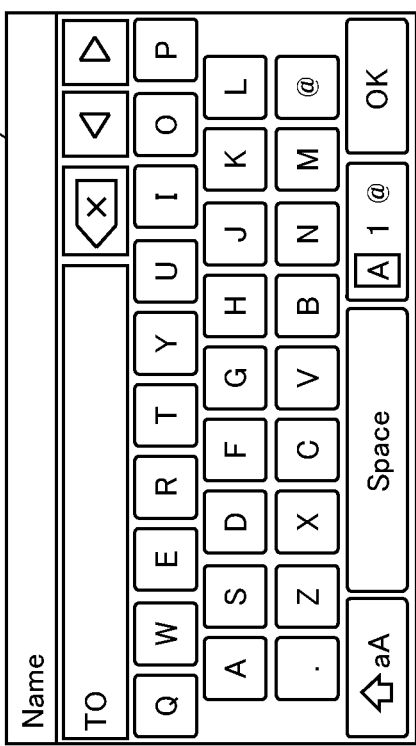
FIGS. 4A-4D show examples of the animation displayed on the panel of the MFP shown in FIG. 1.
Figure 4B:
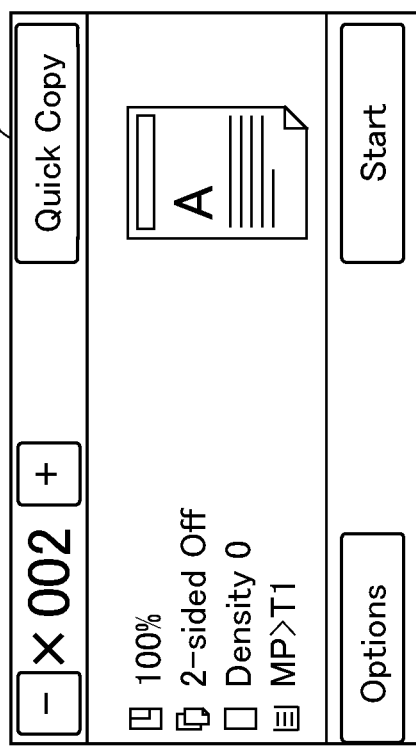

FIG. 4A shows the text input screen 105$d$ after a "Fax" icon 105$b1$ in the panel display 105$b$ in FIG. 3 is pressed to enter a Fax mode. Similarly, FIG. 4B shows a character input screen 105$d'$. The difference between the character input screen 105$d$ in FIG. 4A and the character input screen 105$d'$ in FIG. 4B is that the cursor C1 is displayed at the character input position in the former screen 105$d$, while the cursor C1 is not displayed in the latter screen 105$d'$. Since the cursor C1 is displayed with blinking, the character input screen 105$d$ on which the cursor C1 is displayed and the character input screen 105$d'$ on which the cursor C1 is not displayed are alternately and repeatedly displayed at a particular timing.

Figure 4C:
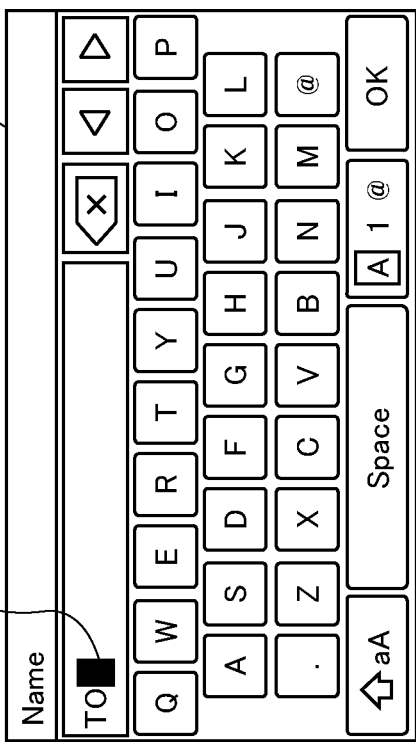
Figure 4D:
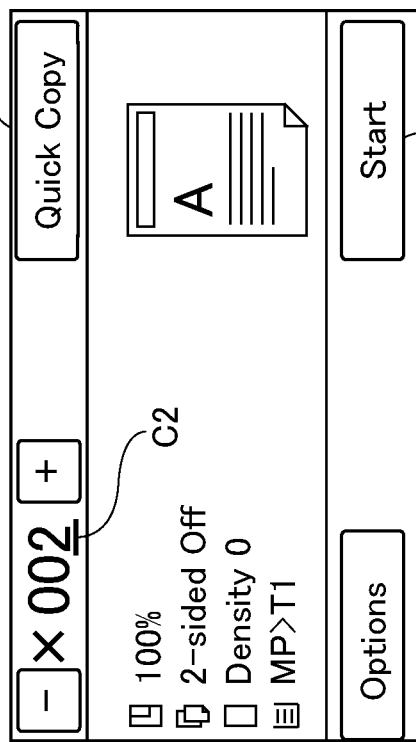

FIG. 4C shows the copy screen 105$e$ after the "Copy" icon 105$b2$ in the panel display 105$b$ in FIG. 3 has been pressed to enter the Copy mode. Similarly, FIG. 4D also shows a copy screen 105$e'$. The difference between the copy screen 105$e$ in FIG. 4C and the copy screen 105$e'$ in FIG. 4D is that in the former screen 105$e$, the cursor C2 is displayed at a position where the number of copies is to be input, while in the latter screen 105$e'$, the cursor C2 is not displayed. Since the cursor C2 is also displayed with blinking, the copy screen 105$e$ on which the cursor C2 is displayed and the copy screen 105$e'$ on which the cursor C2 is not displayed are alternately and repeatedly displayed at a particular timing.

This blinking displays of the cursors C1 and C2 are animations because it is achieved by alternating between a still image with the cursors C1 and C2 lit and a still image with the cursors C1 and C2 unlit.

Figure 5A:
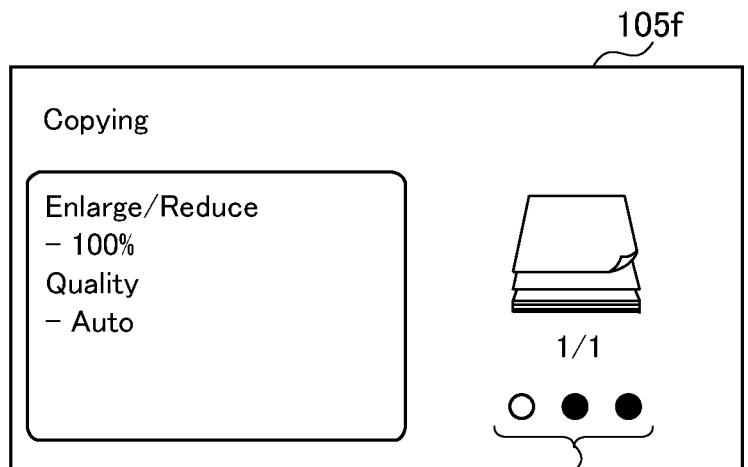
FIGS. 5A-5C show other examples of the animation displayed on the panel of the MFP shown in FIG. 1.
Figure 5B:
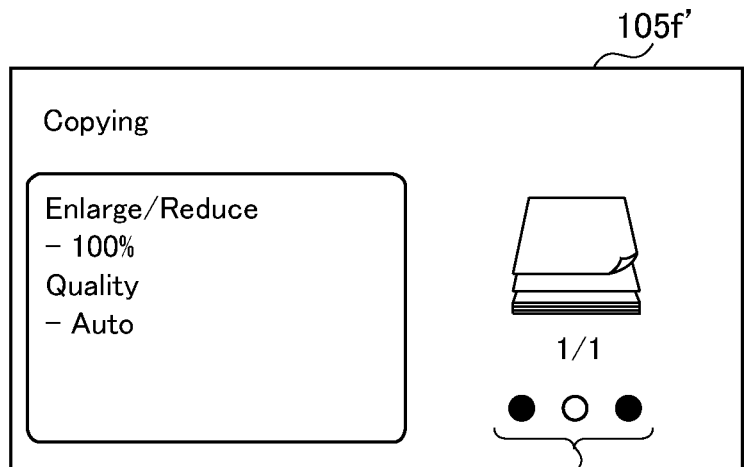
Figure 5C:
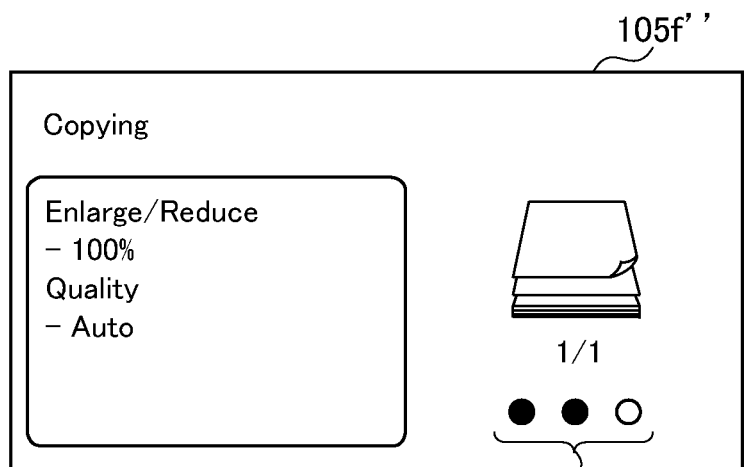

FIG. 5A to FIG. 5C shows examples of "copy-in-progress" screens 105$f$ to 105$f''$, which are displayed when the "Start" button 105$e1$ in the copy screen 105$e$ of FIG. 4C is pressed. In the "copy-in-progress" screens 105$f$ to 105$f''$, the "In-progress" indications I1 to I3 are displayed to indicate that copying is in progress. In the "copy-in-progress" screens I1 to I3, a single-white circle moves among three circles while shifting its position, indicating that copying is in progress. When one of the circles is white, the other circles are black. These in-progress displays I1 to I3 are also animations, since they are realized by switching between still images in which the positions of the white circle in the three circles are the left, the middle, and the right, in sequence at a predetermined timing.

When the "Remote Panel" is displayed on the PC 10 side, the contents displayed on the "Remote Panel" and those on the panel 105 of the MFP 100 are almost the same, as described above. The screen data to display the "Remote Panel" is generated by the MFP 100 in response to the request from the PC 10 to obtain the screen data. Since the screen data generated by the MFP 100 is the same as the screen data to be displayed on the panel 105 of the MFP 100 itself, the contents displayed on the "Remote Panel" and the contents displayed on the panel 105 of the MFP 100 are almost the same. The reason for using the expression "almost the same" is that, as described above, the "Remote Panel" may include the key display 105$c$ that is not displayed on the panel 105.

In a state where the "Remote Panel" is being displayed, if the animations shown in FIGS. 4 and 5 above are displayed on the panel 105 of the MFP 100, the same animations are also displayed in the "Remote Panel." For example, it is assumed that, after the animations shown in FIGS. 4A and 4B, in which the cursor C1 blinks, is displayed on the panel 105, the panel display 105$d$ and the panel display 105$d'$ are alternately and repeatedly displayed. If the PC 10 transmits a request to the MFP 100 to obtain the screen data repeatedly at a particular timing to display the same animations in the "Remote Panel," the same animations can be displayed in the "Remote Panel."

However, in this case, the MFP 100 must repeatedly generate and transmit the same screen data in response to the request from the PC 10 to obtain the screen data. Further, in this case, the MFP 100 must also generate and display the same screen data on the panel 105 of the MFP 100 itself. Therefore, in this case, it is necessary to reduce the load on the CPU 101 of the MFP 100 since the load on the CPU 101 may become excessive and cause delays in other processing.

Therefore, in this case, the MFP 100 generates a plurality of pieces of screen data for displaying each of the plurality of still images constituting the animation only once, and stops generating the same screen data repeatedly so that the load on the CPU 101 is reduced.

Hereinafter, the control process performed by the image processing system 1 configured as described above will be described in detail, referring to FIGS. 6 through 15.

Figure 6A:
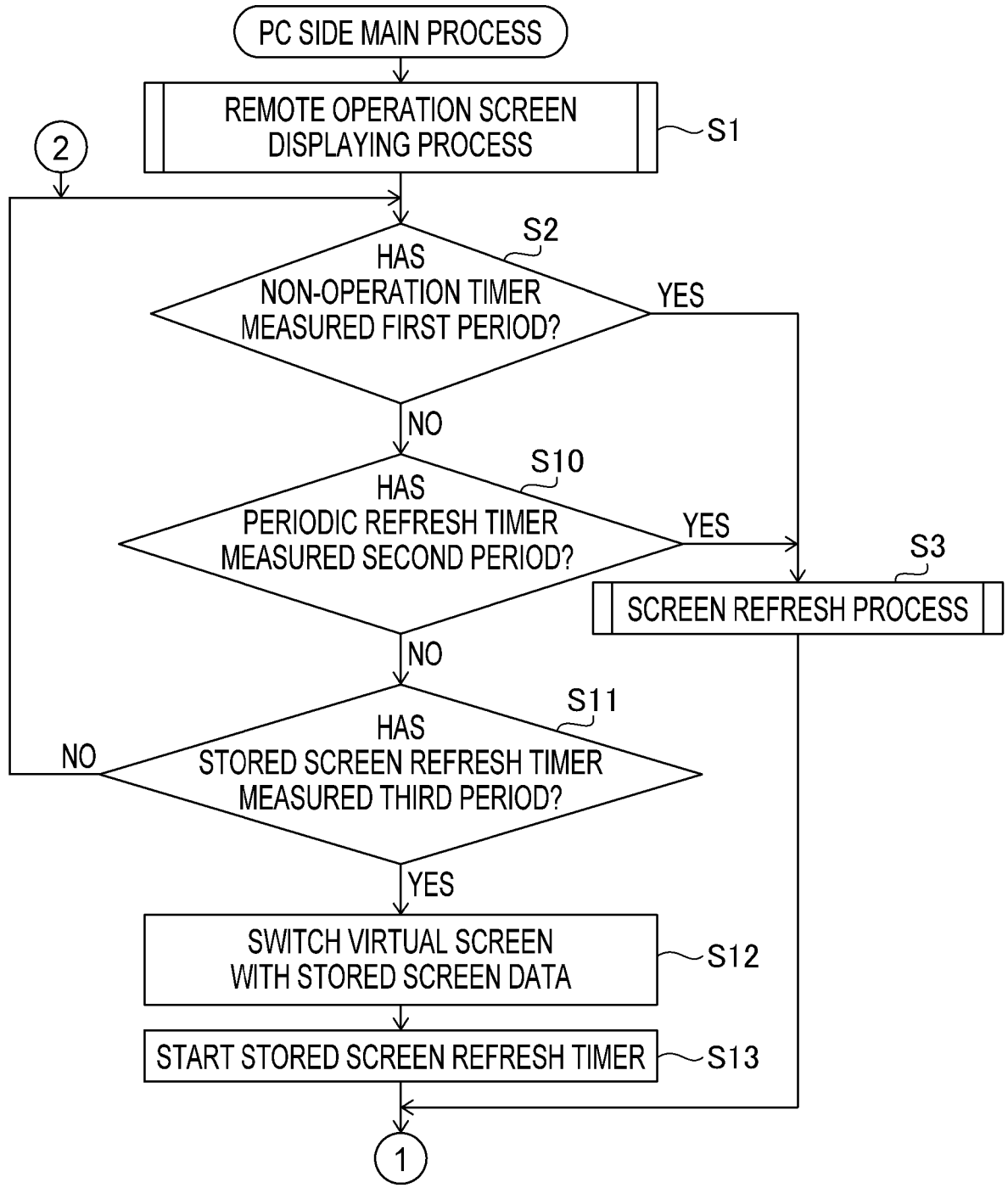
FIGS. 6A and 6B are a flowchart illustrating a main process performed by a CPU of the PC shown in FIG. 1.
Figure 6B:
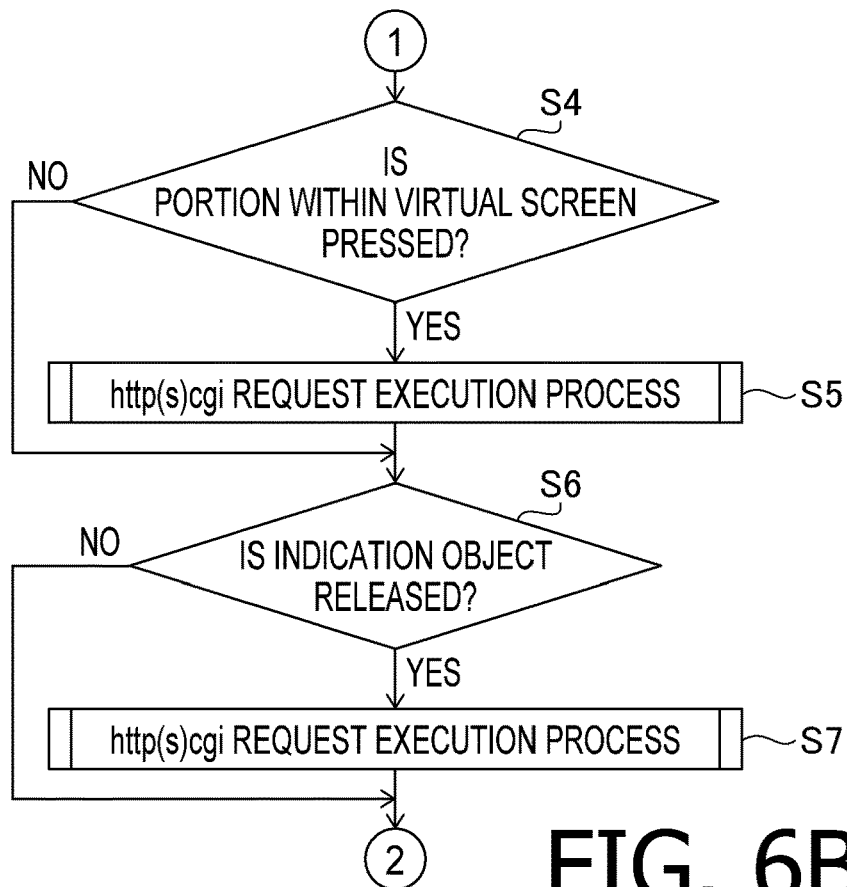

FIGS. 6A and 6B show a flowchart illustrating the main process executed by the CPU 12 of the PC 10. The main process is executed by the CPU 12 after the login authentication is performed in the login authentication screen 190 of FIG. 2B. In the description of each process, steps are simply denoted as "S."

In FIGS. 6A and 6B, the CPU 12 first executes a remote operation screen display process (S1). The remote control screen refers to the "Remote Panel" displayed in the detail pane 184. Therefore, the remote operation screen display process indicates the process of displaying the "Remote Panel" in the detail pane 184.

Figure 7:
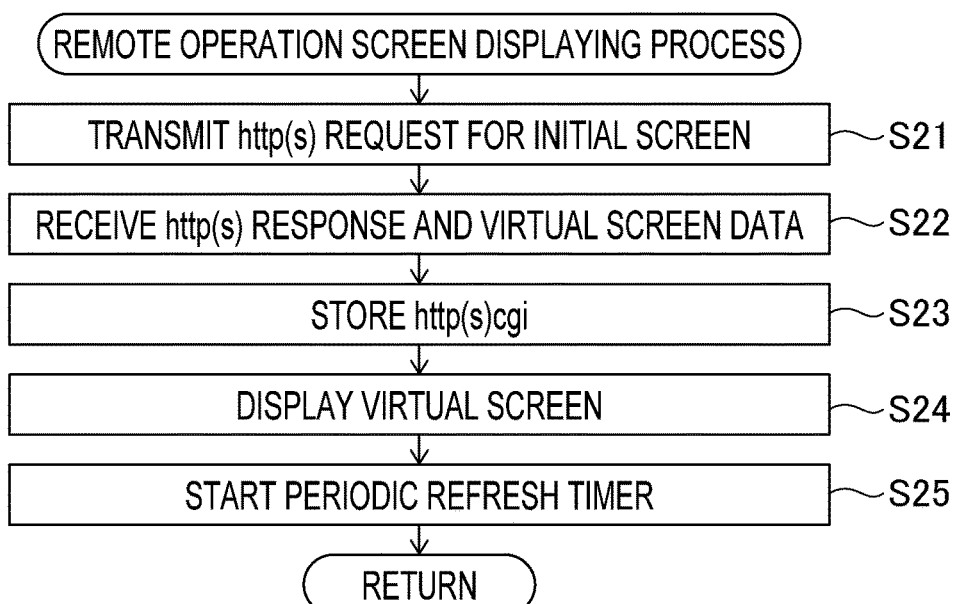
FIG. 7 is a flowchart illustrating a detailed procedure of a remote operation screen displaying process called from the main process of FIGS. 6A and 6B.

FIG. 7 shows a detailed procedure of the remote operation screen display process. In FIG. 7, first, the CPU 12 transmits an http(s) request for an initial screen (S21). It is noted that the http(s) request is a request that follows the http(s) protocol. The reason for transmitting the request according to the http(s) protocol in this way is that a destination of the request is the EWS, and it is necessary to transmit a request in accordance with the protocol that the EWS can interpret. It is noted that the http(s) request for the initial screen is input from the network IF 20 to the network IF 108 via the communication network 40 and the router 32. Not only the http(s) request for the initial screen, but data transmission from PC 10 to MFP 100 is carried out through the same route. Conversely, data transmission from the MFP 100 to the PC 10 is performed through the reverse route.

Next, the CPU 12 receives an http(s) response and virtual screen data which the EWS transmits in response to receipt of the http(s) request for the initial screen (S22). The http(s) response and the virtual screen data are generated and transmitted by an initial screen transmission process (FIG. 10) of S63 described below.

Next, the CPU 12 stores an http(s)cgi in the above data storage area 28 (S23). The http(s)cgi is the various scripts included in the http(s) response. It is noted that the term "cgi" is an abbreviation for a common gateway interface. In this embodiment, a non-operation timer script, a screen data request script, a screen press process script, and a release processing script are generated (see S71 to S73 in FIG. 11). By executing the scripts, the CPU 12 can perform a non-operation timer, an http(s)cgi request transmission process and the like.

Further, the CPU 12 displays received virtual screen data in the detail pane 184 (S24), and after starting a periodic refresh timer (S25), terminates the remote operation screen display process. As a result, the "Remote Panel" as shown in FIG. 3 is displayed in the detail pane 184. It is noted that the periodic refresh timer is a timer to measure a time interval selected in the "Refresh Interval" selection field 184*b* (FIG. 3).

Returning to FIGS. 6A and 6B, the CPU 12 determines whether the non-operation timer has measured a first period (S2). It is noted that the "first period" is, for example, 0.5 seconds. The non-operation timer is a timer that is instructed to start at the end of the http(s)cgi request execution process (S50), which is described below using FIG. 9. The first period is counted from a particular operation (e.g., a press or release operation) performed by the user of the PC 10 on the "Remote Panel."

When it is determined that the non-operation timer has measured the first period (S2: YES), the CPU 12 executes a screen refresh process (S3), and then proceeds the process to S4. On the other hand, when it is determined that the non-operation timer has not yet measured the first period (S2: NO), the CPU 12 proceeds the process to S10.

Figure 8:
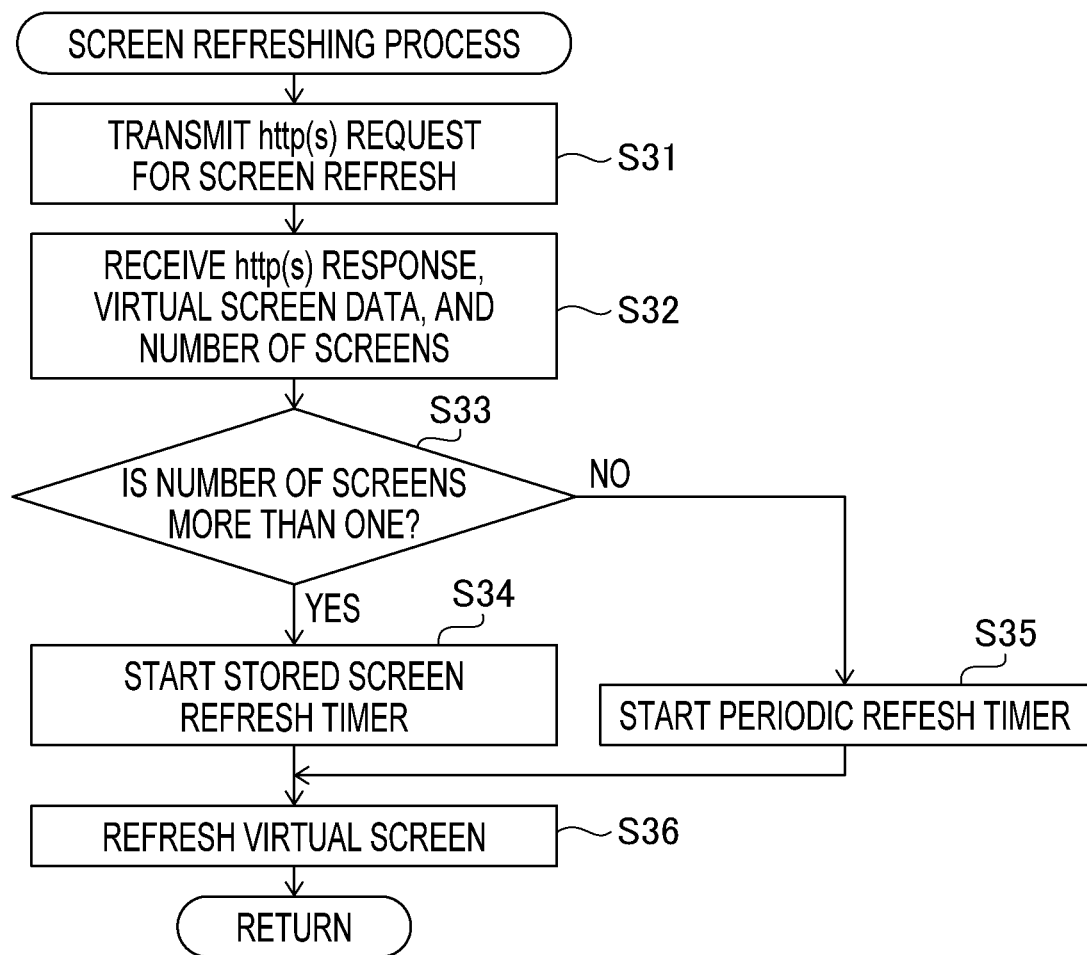
FIG. 8 is a flowchart illustrating a detailed procedure of a screen refresh process called from the main process shown in FIGS. 6A and 6B.

FIG. 8 shows the detailed procedure of the screen refresh process. In FIG. 8, first, the CPU 12 transmits an http(s) request for screen refresh (S31). Then, the CPU 12 receives the http(s) response, virtual screen data, and information indicating the number of screens which the EWS transmits in response to receipt of the http(s) request for screen refresh (S32). The received http(s) response, the virtual screen data and the information indicating the number of screens are stored in the data storage area 28. It is noted that the http(s) response, the virtual screen data and the number of screens are generated and transmitted in the screen data transmission process in S65 of FIG. 10 described below. It is noted that the "number of screens" is the number of screens of the generated virtual screen data. The reason for generating and transmitting such number of screens is that when the virtual screen data is screen data for displaying a plurality of still images constituting an animation, the number of screens of the virtual screen data will be plural (see FIG. 4 and FIG. 5 above). Further, it is because the CPU 12 is configured to differ the process of displaying the virtual screen data received in S32 above between a case where the number of screens of the virtual screen data is plural and a case where the number of screens is single.

Next, the CPU 12 determines whether or not the number of received screens is two or more (S33). When it is determined that the number of received screens is two or more (S33: YES), the CPU 12 starts a saved screen refresh timer (S34), and then proceeds to S36. It is noted that the "saved screen refresh timer" is a timer for measuring the switching timing (refresh timing) when the virtual screen data having two or more screens is received and stored in the data storage area 28, and displayed in the detail pane 184 while selecting and switching the stored virtual screen data of two or more screens one by one. In this embodiment, a third time (for example, one second) is used as the refresh timing.

On the other hand, when it is determined that the number of screens received was one (S33: NO), the CPU 12 starts the above periodic refresh timer (S35) and then proceeds to S36.

In S36, the CPU 12 refreshes the virtual screen, that is, the "Remote Panel" based on the received virtual screen data, and then terminates the screen refresh process. Accordingly, the "Remote Panel" displayed in the detail pane 184 becomes the same as the current display screen displayed on the panel 105 of the MFP 100.

Returning to FIGS. 6A and 6B, in S10, the CPU 12 determines whether the periodic refresh timer has measured the second period. The periodic refresh timer is a timer for measuring the time interval selected in the "Refresh Interval" selection field 184*b* (FIG. 3) as described above. The "second period" is, for example, 10 seconds in this embodiment. When it is determined that the periodic refresh timer has measured the second period (S10: YES), the CPU 12 proceeds to S3 above. On the other hand, when it is determined that the periodic refresh timer has not yet measured the second period (S10: NO), the CPU 12 proceeds the process to S11.

In S11, the CPU 12 determines whether the saved screen refresh timer has measured the third time. When it is determined that the saved screen refresh timer has measured the third time (S11: YES), the CPU 12 advances the process to S12. On the other hand, when it is determined that the saved screen refresh timer has not yet measured the third time (S11: NO), the CPU 12 returns the process to S2 above.

In S12, the CPU 12 switches the virtual screen with the virtual screen data (that is, the saved screen data) received in S32 and saved in the data storage area 28. When the saved screen refresh timer has started measuring, there are two or more screens of received virtual screen data, i.e., an animation is to be displayed in the "Remote Panel." The first of the two or more screens of virtual screen data will be displayed in the "Remote Panel" when the saved screen refresh timer is started (see S34 and S36 in FIG. 8 above). In S12, the virtual screen data to be displayed next will be displayed in the "Remote Panel."

In S13, the CPU 12 starts the saved screen refresh timer. After that, the CPU 12 advances the process to S4.

For example, when the animation of blinking cursor C1 shown in FIG. 4A and FIG. 4B is to be displayed in the "Remote Panel," firstly, the virtual screen in which the cursor C1 in FIG. 4A is lit is displayed in the "Remote Panel" in S36. Then, the saved screen refresh timer has measured the third time, the virtual screen in which the cursor C1 in FIG. 4B is turned off is displayed in the "Remote Panel" in S12. After that, when the cursor C1 keeps blinking repeatedly at the same position, in response to the saved screen refresh timer measuring the third time, the virtual screen in which the cursor C1 in FIG. 4A is lit is displayed in the "Remote Panel" in S12, and when the saved screen refresh timer reaches the third time, S12 is executed again to display the virtual screen in which the cursor C1 is unlit (FIG. 4B) is displayed in the "Remote Panel." Thereafter, the virtual screen with the cursor C1 lit and the virtual screen with the cursor C1 unlit are alternately displayed in the "Remote Panel."

In S4, the CPU 12 determines whether a portion inside the virtual screen has been pressed down. When it is determined that a portion inside the virtual screen has been pressed (S4: YES), the CPU 12 executes the http(s)cgi request execution process (S5), and then proceeds to S6. On the other hand, when it is determined that a portion inside the virtual screen was not pressed (S4: NO), the CPU 12 skips S5 and proceeds the process to S6.

Figure 9:
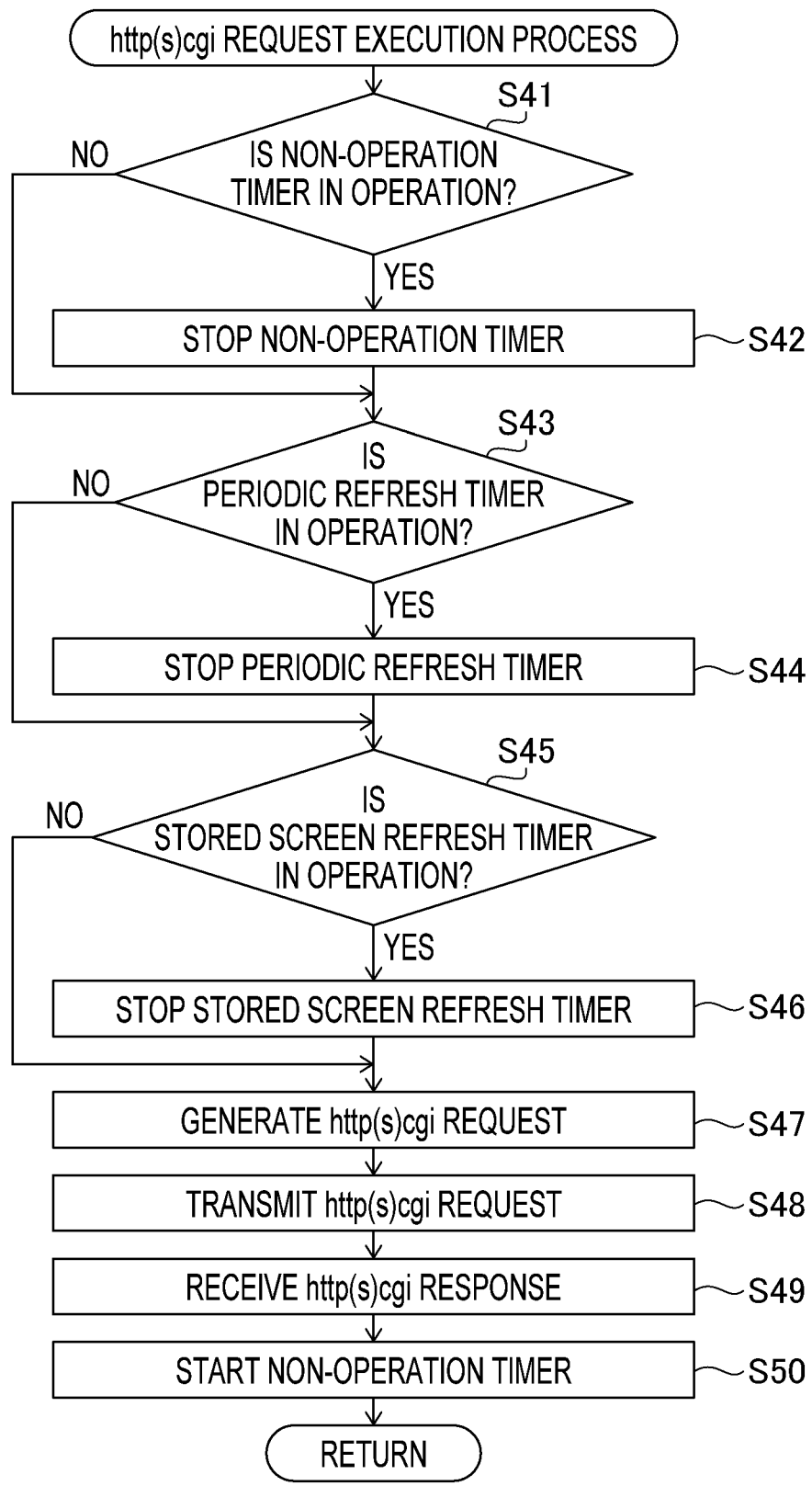
FIG. 9 is a flowchart illustrating a detailed procedure of an http(s)cgi request execution process called from the main process shown in FIGS. 6A and 6B.

FIG. 9 shows a detailed procedure of the http(s)cgi request execution process. In FIG. 9, first, the CPU 12 determines whether the non-operation timer is in operation (S41). When it is determined that the non-operation timer is in operation (S41: YES), the CPU 12 stops the non-operation timer (S42), and then proceeds to S43. On the other hand, when it is determined that the non-operation timer is not in operation (S41: NO), the CPU 12 skips S42 and proceeds to S43.

In S43, the CPU 12 determines whether the periodic refresh timer is in operation. When it is determined that the periodic refresh timer is in operation (S43: YES), the CPU 12 stops the periodic refresh timer (S44), and then proceeds to S45. On the other hand, when it is determined that the periodic refresh timer is not in operation (S43: NO), the CPU 12 skips S44 and proceeds to S45.

In S45, the CPU 12 determines whether the saved screen refresh timer is in operation. When it is determined that the saved screen refresh timer is in operation (S45: YES), the CPU 12 stops the saved screen refresh timer (S46), and then proceeds to S47. On the other hand, when it is determined that the saved screen refresh timer is not in operation (S45: NO), the CPU 12 skips S46 and proceeds the processing to S47.

The reason for stopping the non-operation timer and the periodic refresh timer as described above is to postpone the execution of the screen refresh process in S3 (FIGS. 6A and 6B) so that the "Remote Panel" screen will not be refreshed until the http(s)cgi request execution process is completed. The reason for stopping the saved screen refresh timer is to postpone the execution of the virtual screen switching process in S12 (FIGS. 6A and 6B), and to prevent the "Remote Panel" screen from being refreshed until the http(s)cgi request execution process is completed.

When there is an icon or a button at the pressed position in the virtual screen, the screen transitions or the color of the button changes. The http(s)cgi request execution process is a process to realize such a change of the state of the display screen in the virtual screen. Therefore, if the screen refresh process or the virtual screen switching process is executed while the http(s)cgi request execution process is being performed, there may be a discrepancy between the virtual screen and the actual screen of the panel 105. Steps S42, S44 and S46 are provided to prevent such a problem.

In S47, the CPU 12 generates an http(s)cgi request, and in the subsequent S48, the CPU 12 transmits the generated http(s)cgi request. It is noted that the generated http(s)cgi request includes the screen press information indicating that the screen has been pressed and the coordinates of the pressed position (hereinafter referred to as "pressed coordinates").

Next, the CPU 12 receives the http(s)cgi response transmitted by EWS in response to the http(s)cgi request, and executes a process according to the http(s)cgi response (S49). The http(s)cgi response is generated and transmitted in the screen pressing process in S67 (FIG. 10) described below.

Further, the CPU 12 starts the non-operation timer (S50), and then terminates the http(s)cgi request execution process. Thereafter, when the non-operation timer has measured the first period (e.g., 0.5 seconds), the screen refresh process (S3 of FIGS. 6A and 6B) is executed once.

Returning to FIGS. 6A and 6B, in S6, the CPU 12 determines whether an indication object has been released. The indication object is an object that is pressed when a portion inside the virtual screen is pressed. In other words, an indication object includes both an object that is meaningful when pressed (e.g., icons, buttons) and an object that is meaningless even if pressed (e.g., a part of a background image).

When it is determined that the indication object has been released (S6: YES), the CPU 12 executes the http(s)cgi request execution process (S7), and then returns the process to S2 above. On the other hand, when it is determined that the indication object has not been released (S6: NO), the CPU 12 skips S7 and returns the process to S2. The http(s)cgi request execution process is the http(s)cgi request execution process shown in FIG. 9. It is noted, however, the content of the http(s)cgi request to be generated is different between a case where the http(s)cgi request execution process is executed in S5 and a case where the http(s)cgi request execution process is executed in S7. That is, the http(s)cgi request generated in S5 contains the screen press information and the like, whereas the http(s)cgi request generated in S7 contains the release information indicating that the indication object has been released and the coordinates of the position where the indication object has been released (hereinafter referred to as "release coordinates").

Figure 10:
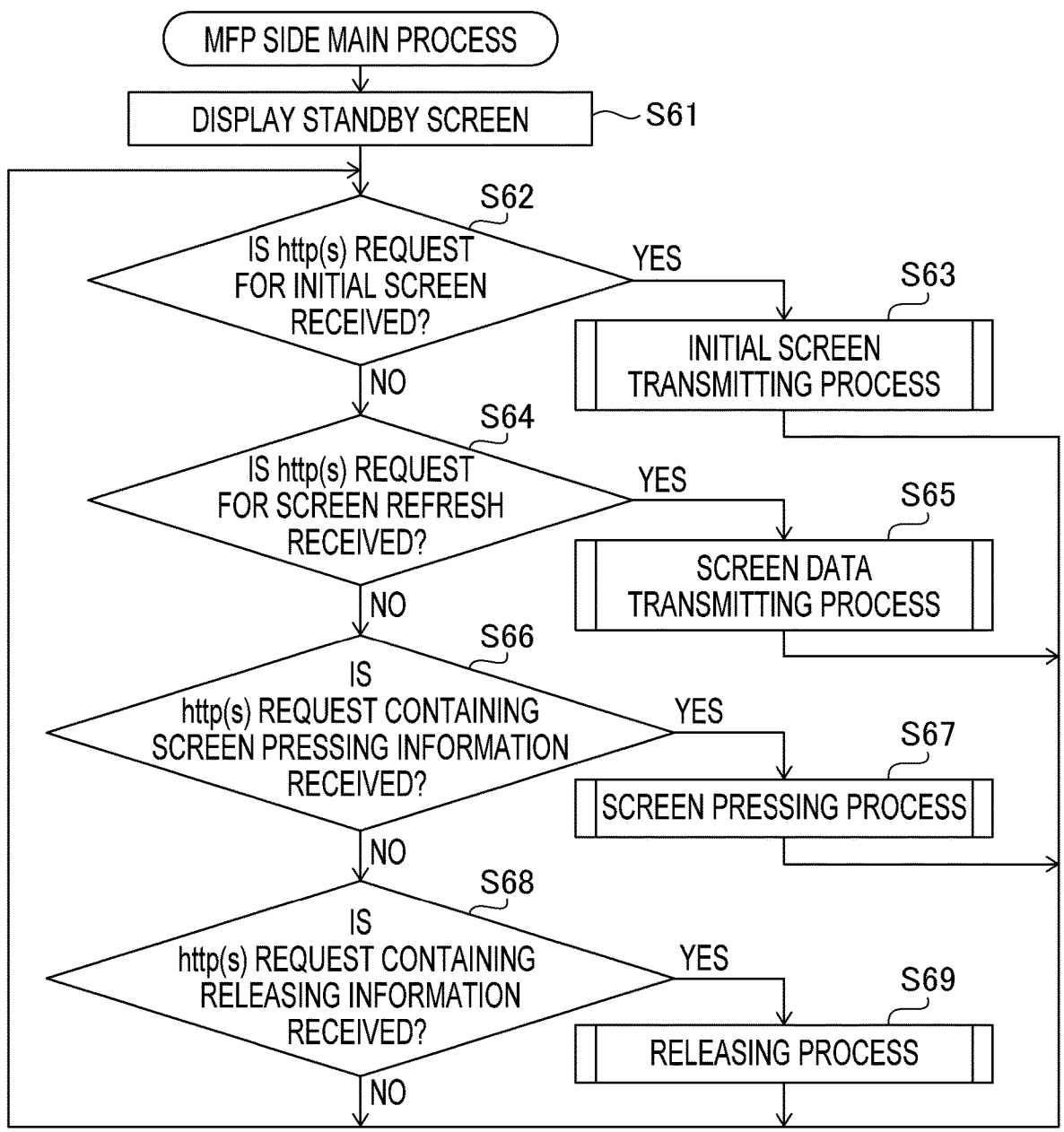
FIG. 10 is a flowchart illustrating a main process performed by a CPU of the MFP shown in FIG. 1.

FIG. 10 shows the main process performed by the CPU 101 of the MFP 100. In FIG. 10, first, the CPU 101 displays a standby screen on the panel 105 (S61). The standby screen is, for example, a screen similar to the panel display 105b shown in FIG. 3.

Next, the CPU 101 determines whether an http(s) communication, that is, a data communication according to the protocol of http(s) is an http(s) request for the initial screen (S62). When it is determined that the http(s) communication is an http(s) request for the initial screen (S62: YES), the CPU 101 executes the initial screen transmission process (S63), and then returns the process to S62 above.

Figure 11:
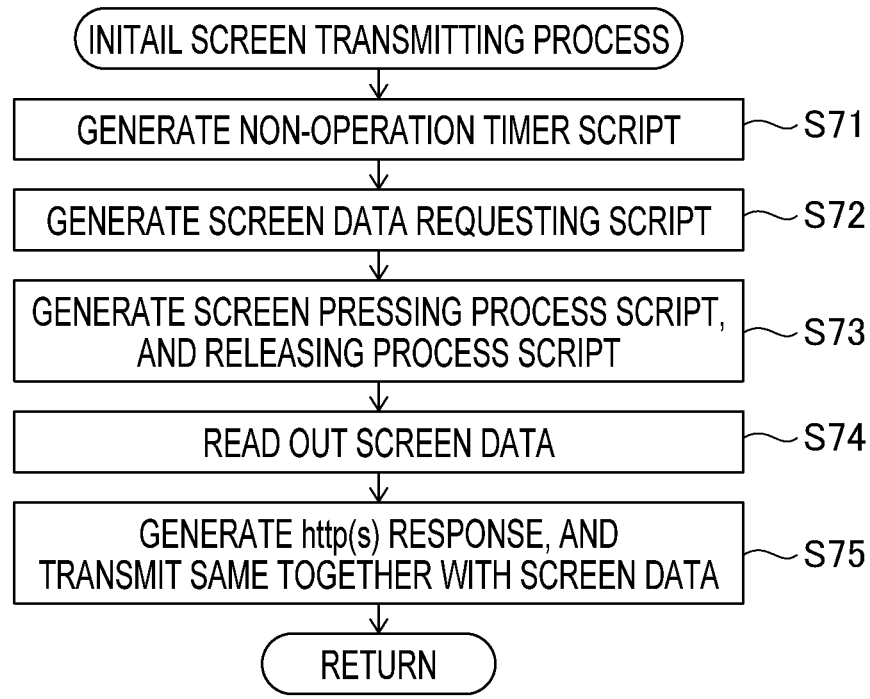
FIG. 11 is a flowchart illustrating a detailed procedure of an initial screen transmitting process called from the main process shown in FIG. 10.

FIG. 11 shows a detailed procedure of the initial screen transmission process. In FIG. 11, first, the CPU 101 generates a non-operation timer script (S71). The non-operation timer script is a program that causes the browser to operate the non-operation timer and perform, for example, the process of S2.

Next, the CPU 101 generates a screen data request script (S72). The screen data request script is a program that causes the browser to perform the screen data request process and to generate an http(s) request containing the screen data request, for example, a screen refresh http(s) request to be sent in S21.

Next, the CPU 101 generates a screen pressing process script and a releasing process script (S73). The screen pressing process script is a program that causes the browser to perform a screen pressing process. The screen pressing process includes, for example, a determination process of S4 and processes S41 to S48 (FIG. 9) contained in S5 which is executed when the determination in S4 is "YES." The "Releasing process script" is a program that causes the browser to execute the releasing process which includes, for example, the determination process in S6 and the processes S41 to S48 in S7, which are executed when the determination in the decision in S5 is "YES."

Next, the CPU 101 reads out the screen data (S74). The screen data is the data representing the screen currently displayed on the panel 105 of the MFP 100. When the MFP 100 displays a screen on the panel 105, the screen data is generated and stored in the RAM 103. Then, the screen data is read out and displayed on the panel 105. Therefore, in S74, the CPU 101 reads the screen data from the RAM 103.

Next, the CPU 101 generates an http(s) response and transmits the same together with the read screen data (S75), and then terminates the initial screen transmission process. The http(s) response is a response to the http(s) request for the initial screen in S21 (FIG. 7). The http(s) response contains the script generated in S71 to S73 and information indicating that the screen data is transmitted together.

Returning to FIG. 10, when it is determined that the communication according to the http(s) is not an initial screen http(s) request (S62: NO), the CPU 101 determines whether the communication according to the http(s) is a screen refresh http(s) request (S64). When it is determined that the http(s) communication is the screen refresh http(s) request (S64: YES), the CPU 101 executes the screen data transmission process (S65), and then returns the processing to S62.

Figure 12:
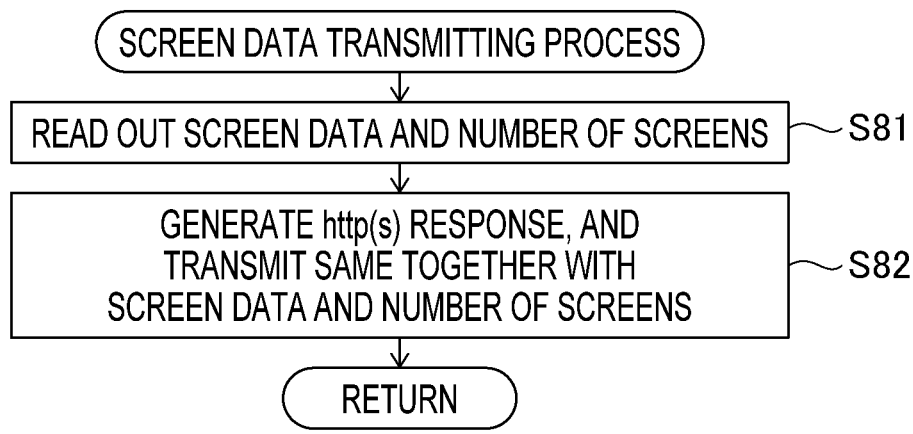
FIG. 12 is a flowchart illustrating a detailed procedure of a screen data transmitting process called from the main process shown in FIG. 10.

FIG. 12 shows the detailed procedure of the screen data transmission process. In FIG. 12, first, the CPU 101 reads out the screen data and the number of screens (S81). In S81, the CPU 101 reads the screen data stored in the RAM 103 in S93 (FIG. 13) or S105 (FIGS. 14A and 14B) described below. The number of screens may be stored together with the screen data when the CPU 101 stores the screen data in the RAM 103. Of course, such a configuration is only an example and the number of screens may be counted by the CPU 101 when reading out the screen data without storing the number of screens.

Next, the CPU 101 generates an http(s) response and transmits the same together with the read screen data and the number of screens (S82), and then terminates the screen data transmission process. The process of S82 differs from the process of S75 only in that the http(s) response is a response to the scree refresh http(s) request of S31 (FIG. 8) and in that the number of screens is to be transmitted. Therefore, further explanation will not be provided.

Returning to FIG. 10, when it is determined that the communication of http(s) is not the screen refresh http(s) request (S64: NO), the CPU 101 determines whether the communication of http(s) is an http(s)cgi request containing screen pressing information and the like (S66). When it is determined that the http(s) communication is an http(s)cgi request containing the screen pressing information and the like (S66: YES), the CPU 101 executes the screen pressing process (S67), and then returns the process to S63.

Figure 13:
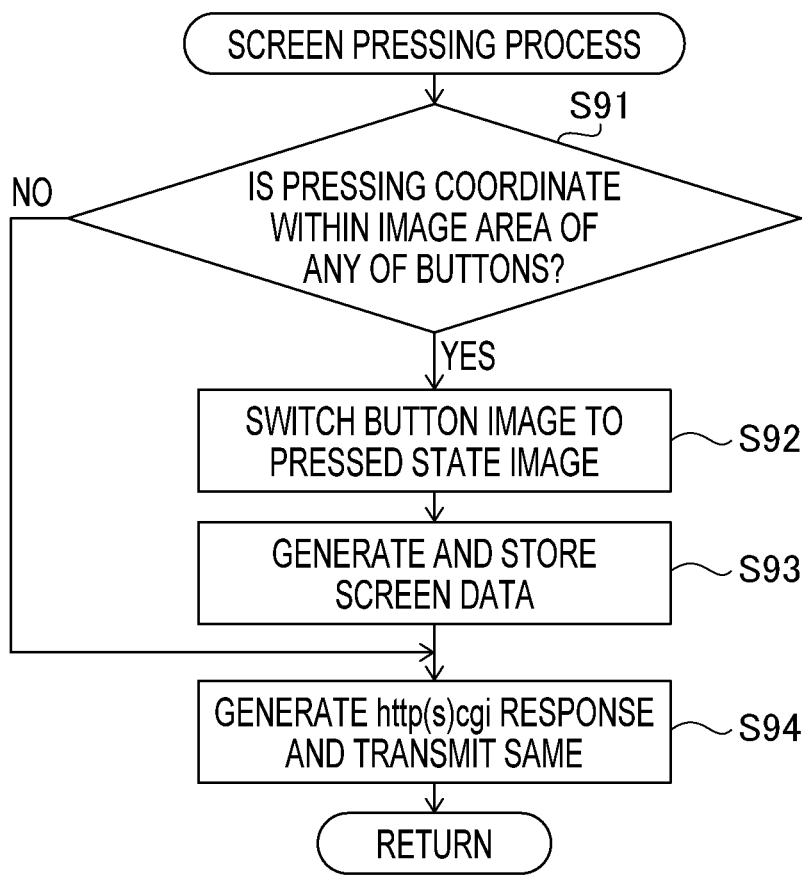
FIG. 13 is a flowchart illustrating a detailed procedure of a screen pressing process called from the main process shown in FIG. 10.

FIG. 13 shows the detailed procedure of the screen pressing process. In FIG. 13, first, the CPU 101 determines whether the pressed coordinate is within the area of any button image (S91). When it is determined that the pressed coordinate is within the area of one of the button images (S91: YES), the CPU 101 switches the button image to an image showing a pressed state (S92). The button image can be, for example, an icon ("Fax" icon 105b1, "Copy" icon 105b2, etc.) or a button ("Basic 1" button, "Custom 1" button, etc.). Switching of the pressing mode means, for example, switching of the color of the button image from the color of the non-pressing mode (normal mode) to a different color.

Next, the CPU 101 generates screen data, stores the same in the RAM 103 (S93), and then proceeds to S94. The screen data is data for displaying the "Remote Panel." The screen data stored in the RAM 103 is read out and used in the screen data transmission process shown in FIG. 12.

On the other hand, when it is determined that the pressed coordinate is not within the area of any button image (S91: NO), the CPU 101 skips S92 and S93 and proceeds the process to S94.

In S94, the CPU 101 transmits the http(s)cgi response, and then terminates the screen pressing process.

Returning to FIG. 10, when it is judged that the http(s) communication is not an http(s)cgi request containing screen pressing information and the like (S66: NO), the CPU 101 determines whether the http(s) communication is an http(s) cgi request containing the release information and the like (S68). When it is determined that the http(s) communication is the http(s)cgi request containing the releasing information and the like (S68: YES), the CPU 101 executes the releasing process (S69), and then returns the processing to S62. On the other hand, when it is determined that the http(s) communication is not the http(s)cgi request containing the releasing information and the like (S68: NO), the CPU 101 returns the process to S62 above.

Figure 14A:
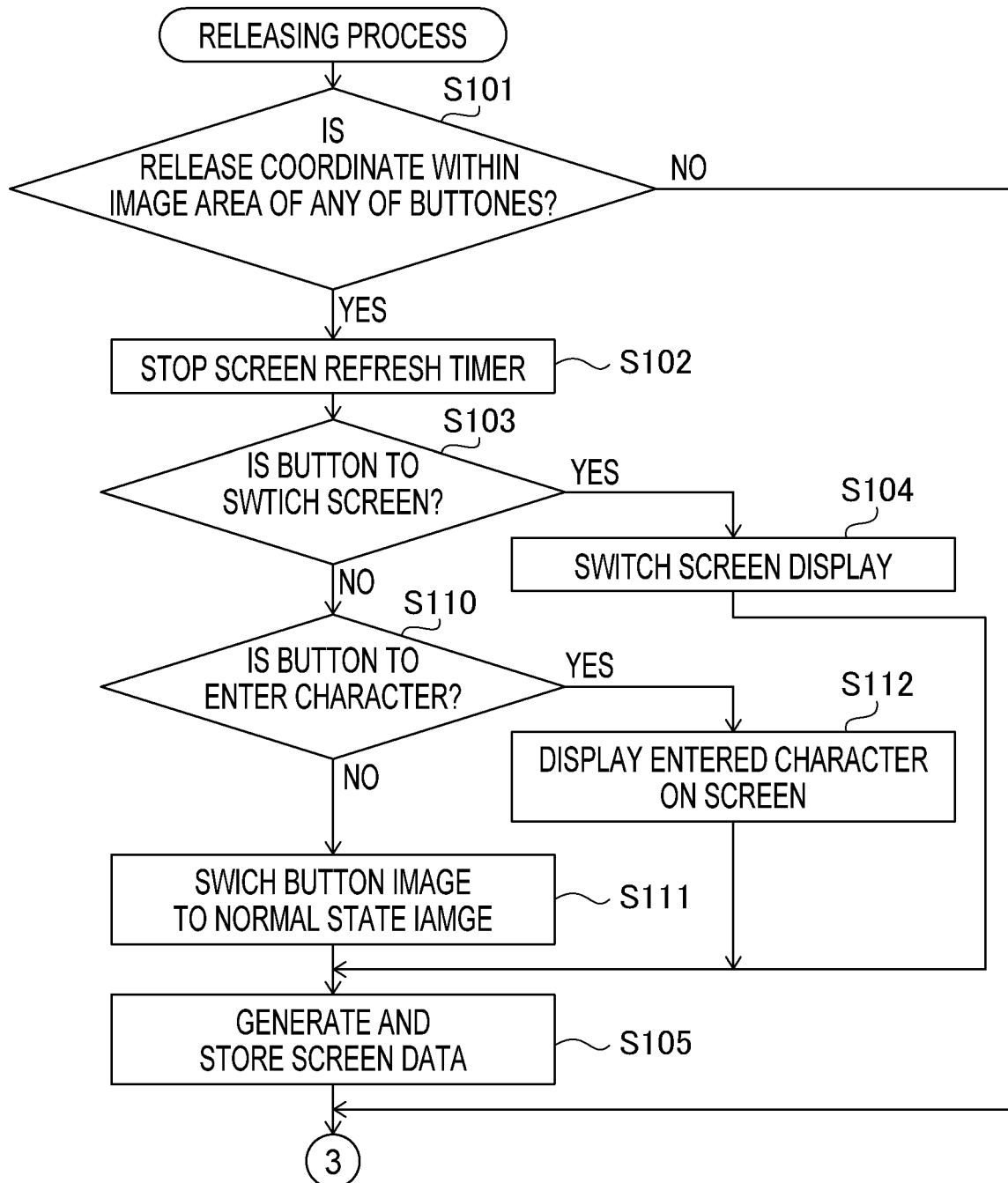
FIGS. 14A and 14B are a flowchart illustrating a detailed procedure of a releasing process called from the main process shown in FIG. 10.
Figure 14B:
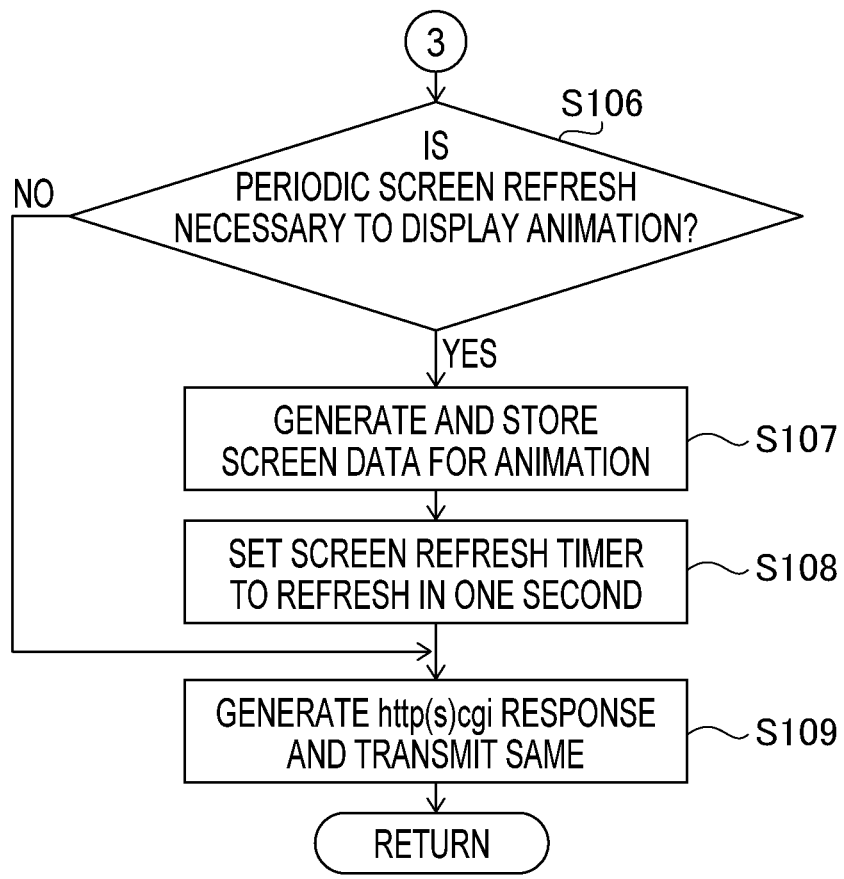

FIGS. 14A and 14B show the detailed procedure of the releasing process. In FIG. 14, first, the CPU 101 determines whether the release coordinate is within the area of one of the button images (S101). When it is determined that the release coordinate is within the area of any button image (S101: YES), the CPU 101 stops the screen refresh timer (S102). The screen refresh timer is a timer controlled by the CPU 101, and when the count value is stored in a register, thereby instructing the start, the CPU 101 decrements the count value at a particular timing. When the count value in the register reaches "0," an interrupt signal is generated and output to the CPU 101. In response to receipt of the interrupt signal, the CPU 101 executes a time-up interrupt process described below with reference to FIG. 15.

Next, the CPU 101 determines whether the button of the button image within which the release coordinate is determined to be included in S101 is a button that switches the screen (S103). When it is determined that the button is a button that switches the screen (S103: YES), the CPU 101 switches the screen display of the panel 105 to the screen indicated by the button (S104), and then proceeds to S105. The button is, for example, the "Copy" icon 105b2 in the panel display 105b in FIG. 3. When the "Copy" icon 105b2 is released, the panel display 105b is switched to the copy screen 105e shown in FIG. 4C.

In S105, the CPU 101 generates and stores the screen data to be displayed on the "Remote Panel." When the processing proceeds from S104 to S105, the CPU 101 generates the screen data that is the same as the screen display of the panel 105 after switching, and stores the screen data in the RAM 103 in the same manner as in S93. When the screen display of the panel 105 after switching is, for example, the copy screen 105e, the CPU 101 generates the screen data to display the screen same as the copy screen 105e on the "Remote Panel" and stores the same in the RAM 103.

On the other hand, when it is determined that the button is not a button to switch the screen (S103: NO), the CPU 101 determines whether the button is a character input button (S110). When it is determined that the button is not a character input button (S110: NO), the CPU 101 switches the button image of the button in the display screen of the panel 105 to a normal state (S111), and then proceeds to S105. As a result, the button image of the button that has been released is switched from the pressed state to the normal state on the panel 105.

When it is determined that the button is the character input button (S110: YES), the CPU 101 displays input characters on the screen (S112) and then proceeds the process to S105. Thus, the input characters are displayed within the screen on the panel 105.

On the other hand, when it is determined that the release coordinate is not within the area of any button image (S101: NO), the CPU 101 proceeds the process from S101 to S106. In this case, since the screen data generation and storage process of S105 is not executed, the screen data is not transmitted along with the http(s)cgi response generated in S109, which will be described below.

In S106, the CPU 101 determines whether a periodic screen refresh is necessary for displaying the animation. In this determination, the CPU 101 determines whether the animation is being displayed on the panel 105 since, if the animation is being displayed on the panel 105, a periodic screen refresh is necessary.

When it is determined that periodic screen refresh is necessary (S106: YES), the CPU 101 generates and stores the screen data for the animation (S107). For example, in a case of displaying an animation in which the cursor C1 blinks on the panel 105 as shown in FIG. 4A and FIG. 4B, the CPU 101 generates the screen data for the animation in which the cursor C1 is lit as shown in FIG. 4A and the screen data for the animation in which the cursor C1 is unlit as shown in FIG. 4B and stores the screen data in the RAM 103 in S107.

Next, the CPU 101 sets a count value in the register such that the screen refresh timer times up in one second (S108), and then proceeds the process to S109.

On the other hand, when it is determined that the periodic screen refresh is unnecessary (S106: NO), the CPU 101 skips S107 and S108 and proceeds the process to S109.

In S109, the CPU 101 generates and transmits the http(s)cgi response. Thereafter, the CPU 101 terminates the releasing process.

For example, when the "Copy" icon 105b2 is released in the panel display 105b of FIG. 3, the CPU 12 of the PC 10 performs the http(s)cgi request execution process in S7 (FIGS. 6A and 6B). As a result, the CPU 12 generates an http(s)cgi request indicating that the "Copy" icon 105b2 has been released (S47 in FIG. 9 above), and transmits the generated http(s)cgi request (S48). The http(s)cgi request generated here contains the release information indicating that the "Copy" icon 105b2 has been released and the released coordinates. Since the http(s)cgi request transmitted by the CPU 12 of the PC 10 to the MFP 100 includes the release information and the like., when the CPU 101 of the MFP 100 receives this http(s)cgi request from the PC 10, the CPU 101 executes the releasing process in S69 (FIG. 10).

In this releasing process, the CPU 101 of the MFP 100 advances the process from S101, S102, S103 and S104, in this order, and switches the screen display on the panel 105 to the copy screen 105e shown in FIG. 4C. The CPU 101 of the MFP 100 further advances the process to S105, and generates and stores the screen data for displaying the copy screen 105e on the "Remote Panel."

Then, the CPU 101 of the MFP 100 determines that periodic screen refreshes for animation display are necessary (S106: YES), generates and stores screen data for animation (S107), and sets the screen refresh timer such that the time-up interrupt process is called after one second (S108). Further, the CPU 101 of the MFP 100 generates and transmits an http(s)cgi response to the http(s)cgi request which is generated when the "Copy" icon 105b2 is released (S109).

The CPU 12 of the PC 10 receives the http(s)cgi response from the MFP 100 in S49 of FIG. 9, and starts the non-operation timer in S50. When the non-operation timer measures the first period, e.g., 0.5 seconds, the CPU 12 of the PC 10 advances the process from S2 to S3 in FIGS. 6A and 6B, and executes the screen refresh process. In the screen refresh process of FIG. 8, the CPU 12 of the PC 10 advances the process from S31 to S32. At this time, in S32, the CPU 12 of the PC 10 receives, as the virtual screen data, the screen data for displaying the copy screen 105e (i.e., the screen data for displaying the virtual screen on which the cursor C2 is lit) in the "Remote Panel," and the screen data for displaying the copy screen 105e' shown in FIG. 4D (i.e., the virtual screen on which the cursor C2 is unlit) and the information indicating "two" as the number of screens, and store the same in the data storage area 28. Then, the CPU 12 of the PC 10 advances the process from S33 to S34, starts the saved screen refresh timer, and then refreshes the virtual screen (S36). As a result, firstly, a virtual screen showing the copy screen 105e is displayed in the "Remote Panel."

Then, when the saved screen refresh timer measures the third time, e.g., one second, the CPU 12 of the PC 10 proceeds the process from S11 to S12 of FIGS. 6A and 6B and switches the virtual screen with the saved screen data. As a result, a virtual screen showing the copy screen 105e' is displayed in the "Remote Panel." Then, the CPU 12 of the PC 10 starts the saved screen refresh timer (S13). Thus, as long as the cursor C is blinking at the same position, the CPU 12 of the PC 10 alternately switches between the virtual screen showing the copy screen 105e and the virtual screen showing the copy screen 105e' and displays the same in the "Remote Panel" each time the saved screen refresh timer measures the third time.

Figure 15:
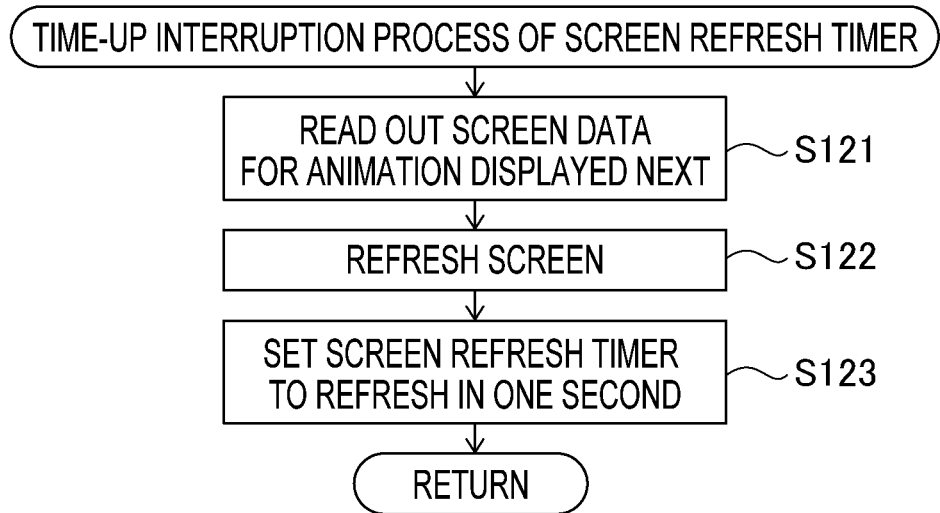
FIG. 15 is a flowchart illustrating a time-up interruption process performed by the CPU of the MFP shown in FIG. 1.

FIG. 15 shows the procedure of the time-up interrupt process of the screen refresh timer. In FIG. 15, first, the CPU 101 reads out the screen data for the animation to be displayed next (S121). For example, in a case of displaying the animation shown in FIGS. 4C and 4D in which the cursor C2 blinks on the panel 105, the CPU 101 generates the screen data for the animation in which the cursor C2 is lit (FIG. 4C) and the screen data for the animation in which the cursor C2 is unlit (FIG. 4D) and store the data in RAM 103 in S107 (FIGS. 14A and 14B). Among the screen data for the animation in which the cursor C2 blinks, the screen data for an animation to be displayed first, that is, the screen data for animation in which the cursor C2 is lit, has already been displayed. Therefore, in this case, in S121, the CPU 101 reads the screen data for animation in which the cursor C2 is unlit.

Next, the CPU 101 refreshes the screen on the panel 105 (S122). As a result, the copy screen 105e' shown in FIG. 4D is displayed on the panel 105.

In addition, the CPU 101 sets a count value in the register such that the screen refresh timer will time up in one second (S123), and then terminates the time-up interrupt process of the screen refresh timer.

When the time-up interrupt process of the screen refresh timer is called again, the CPU 101 reads out the screen data for animation in which the cursor C2 is lit (FIG. 4C) in S121, and refreshes the screen on the panel 105 with the read screen data for animation in S122. As a result, the copy screen 105*e* (FIG. 4C) is displayed on the panel 105.

Thereafter, the copy screen 105*e* shown in FIG. 4C and the copy screen 105*e*' shown in FIG. 4D are alternately displayed on the panel 105 each time the screen refresh timer time-up interrupt process is called.

Thus, according to the time-up interrupt process of the screen refresh timer, once the screen data for animation is generated and stored in the releasing process (S107 in FIGS. 14A and 14B), when the same screen data for animation is repeatedly displayed, the CPU 101 of the MFP 100 only reads and displays the stored screen data for animation (S121, S122), and does not generate the same screen data for animation again.

Similarly, when repeatedly displaying the virtual screen of the same screen data for animation in the "Remote Panel," the CPU 12 of the PC 10 only reads and displays the virtual screen data for displaying the screen data for animation transmitted and saved from the MFP 100 (S36 in FIGS. 8 and S12 in FIGS. 6A and 6B), and does not request the MFP 100 to generate and transmit the virtual screen data for displaying the same screen data for animation again.

According to the embodiment, the measuring time of the periodic refresh timer is unchanged regardless of whether the animation is displayed in the "Remote Panel" or not. Aspects of the present disclosures do not need to be limited to such a configuration. In a case where the animation is displayed in the "Remote Panel," the measuring time of the periodic refresh timer may be longer than a case where the animation is not displayed in the "Remote Panel."

In this embodiment, regarding the screen data for the animation, all the plurality of image data for displaying each of the plurality of still images constituting the animation are received (S32) from the MFP 100 at once in response to transmitting the http(s) request for refreshing the screen to the MFP 100 (S31 in FIG. 8). However, aspects of the present disclosures do not need to be limited to such a configuration. The plurality of image data for displaying each of the plurality of still images constituting the animation may be received one by one from the MFP 100 in response to transmitting the http(s) request for refreshing the screen.

As described above, the image processing system 1 according to the present embodiment includes the PC 10 and the MFP 100, and the PC 10 is configured to remotely access the MFP 100. The PC 10 is equipped with the network IF 20, the display 18, and the CPU 12, and the MFP 100 is equipped with the network IF 108, the panel 105, and the CPU 101.

When the MFP 100 is remotely connected via the network IF 20 of the PC 10, the CPU 12 of the PC 10 periodically transmits a screen refresh request to the MFP 100 to obtain the screen data from the MFP 100 to display the screen on the PC 10 same as the screen displayed on the panel 105 of the MFP 100. Then, the CPU 12 of the PC 10 receives the screen data transmitted by the MFP 100 in response to the screen refresh request, and displays the same screen as the display screen displayed on the panel 105 of the MFP 100 on the display 18 of the PC 10.

When the PC 10 is remotely connected to the MFP 100 via the network IF 108 of the MFP 100, the CPU 101 of the MFP 100 generates the screen data and transmit the same to the PC 10 in response to receipt of the screen refresh request from the PC 10, selects one image at a time from a plurality of still images constituting the animation, and displays the selected one image with sequentially switching the selected one image. Accordingly, after displaying the animation on the panel 105 of the MFP 100, when the same animation is to be continuously displayed on the panel 105 of the MFP 100, the repeatedly generating of the same screen data as the plurality of screen data is stopped after the generating of the plurality of screen data for display on the MFP 100.

Thus, in the image processing system 1 according to the present embodiment, when the PC 10 is remotely connected via the network IF 108 of the MFP 100, one image is selected from the plurality of still images constituting the animation, and the selected image is sequentially switched while displaying the animation, thereby the animation being displayed on the panel 105 of the MFP 100. Thereafter, when the same animation is to be continuously displayed on the panel 105 of the MFP 100, after multiple screen data for displaying each of the multiple still images constituting the animation on the PC 10 is generated, repetitive generating of the same screen data is stopped. Therefore, it becomes possible to suppress load to the CPU 101 from becoming excessive even when the animation is displayed on the MFP 100 side, to make the movement of the animation closer to the original movement, and also to control the delay in response to the screen data obtaining request from the PC 10.

Incidentally, in this embodiment, the PC 10 is an example of an "information processing device." The MFP 100 is an example of an "image processing device." The CPUs 12, 101 are examples of a "controller." The display 18, panel 105 are examples of a "display." The network IFs 20, 108 are examples of a "communication interface."

When the display screen shown on the panel 105 of the MFP 100 is a screen that displays the animation, the CPU 12 of the PC 10 increases the time interval for transmitting the periodic screen refresh requests to the MFP 100.

According to the above configuration, the CPU 101 of the MFP 100 further suppresses the load to the CPU 101 of the MFP 100 since the time interval for generating the screen data and transmitting the same to the PC 10 becomes longer.

The PC 10 is further provided with the storage 14. When the display screen shown on the panel 105 of the MFP 100 is a screen that displays an animation, the CPU 12 of the PC 10 receives the screen data which is transmitted by the MFP 100 one screen data at a time from the plurality of screen data in response to the screen refresh request and stores the same in the storage 14. When the same animation is displayed on the display 18 of the PC 10, the animation is displayed using the screen data stored in the storage 14.

The PC 10 is further provided with the storage 14. When the display screen shown on the panel 105 of the MFP 100 is a screen for displaying an animation, the CPU 12 of the PC 10 receives all of the plurality of screen data sent by the MFP 100 at a time in response to the screen refresh request and stores the same in the storage 14. When the same animation as the animation is to be displayed on the display 18 of the PC 10, the animation is displayed using the multiple screen data stored in the storage 14.

When transmitting multiple screen data, the CPU 101 of the MFP 100 also transmits information indicating that multiple screen data are included (S82 in FIG. 12).

Accordingly, it is convenient since the CPU 12 of the PC 10 can easily recognize how many screen data is to be switched and displayed.

When the display screen shown on the panel 105 of the MFP 100 is a screen showing animation (S44 in FIG. 9), the CPU 12 of the PC 10 stops periodically transmitting the screen refresh requests to the MFP 100.

Accordingly, it is prevented that any discrepancies between the virtual screen and the actual screen of the panel 105.

The present disclosures are not necessarily limited to the above embodiment, and various changes can be made without departing from aspects of the present disclosures.

In the above embodiment, the MFP 100 is used as an example of an image processing device, but the image processing device may be a stand-alone printer, a scanner, or a copier, not necessarily limited to the MFP 100.

In the above embodiment, the CPU 101 has been described as an example of a controller, but the controller may have a CPU and a dedicated circuit. The dedicated circuits may be, for example, an ASIC (Application Specific Integrated Circuit) and FPGA (Field Programmable Gate Array).

In the above embodiment, two screens (see FIG. 4) and three screens (see FIG. 5) are used as examples of screen data for displaying the plurality of still images that constitute the animation, but the number of screens may be greater than three.

What is claimed is:

1. An image processing system including an information processing device and an image processing device,
    wherein the information processing device comprises a first communication interface, a first display, a first controller, and a storage,
    wherein the image processing device comprises a second communication interface, a second display, and a second controller,
    wherein, in a case where the image processing device and the information processing device are remotely connected through the first communication interface and the second communication interface, the first controller is configured to
        periodically transmit a screen update request to the image processing device, the screen update request being a request for screen data, the screen data being used to display a virtual same screen on the first display, the virtual same screen being a screen virtually same as a screen displayed on the second display, and
        receive the screen data transmitted by the image processing device in response to the screen update request, and display, on the first display, the virtual same screen based on the received screen data,
    wherein, in a case where the image processing device and the information processing device are remotely connected through the first communication interface and the second communication interface, the second controller is configured to
        in response to receipt of the screen update request from the information processing device, generate the screen data and transmit the generated screen data to the information processing device,
    wherein, in a case where, a screen displayed on the second display is a screen displaying an animation, the second controller is configured to
        display the animation on the second display by selecting images, one by one, from a plurality of still images constituting the animation and display the selected images by switching the selected images sequentially,
        when an animation that is the same as the animation displayed on the second display is to be displayed continuously on the second display, after generating a plurality of pieces of screen data used to display the plurality of still images, respectively, stop generating screen data same as the plurality of pieces of screen data, and
        in response to receipt of the screen update request from the information processing device, transmit the generated plurality of pieces of screen data to the information processing device, and
    wherein the first controller is configured to
        receive the plurality of pieces of screen data transmitted by the image processing device one by one in response to the screen refresh request,
        store the received screen data in the storage,
        display an animation using the screen data stored in the storage, and
        stop transmitting the screen update request after receiving the plurality of pieces of screen data.

2. An image processing system including an information processing device and an image processing device,
    wherein the information processing device comprises a first communication interface, a first display, and a first controller,
    wherein the image processing device comprises a second communication interface, a second display, and a second controller,
    wherein, in a case where the image processing device and the information processing device are remotely connected through the first communication interface and the second communication interface, the first controller is configured to
        periodically transmit a screen update request to the image processing device, the screen update request being a request for screen data, the screen data being used to display a virtual same screen on the first display, the virtual same screen being a screen virtually same as a screen displayed on the second display, and
        receive the screen data transmitted by the image processing device in response to the screen update request, and display, on the first display, the virtual same screen based on the received screen data,
    wherein, in a case where the image processing device and the information processing device are remotely connected through the first communication interface and the second communication interface, the second controller is configured to
        in response to receipt of the screen update request from the information processing device, generate the screen data and transmit the generated screen data to the information processing device, and
        in a case where, after displaying an animation on the second display by selecting images, one by one, from a plurality of still images constituting the animation and displaying the selected images by switching the selected images sequentially, when an animation same as the animation displayed on the second display is to be displayed continuously, after generating a plurality of pieces of screen data used to display the plurality of still images, respectively, stop generating screen data same as the plurality of pieces of screen data, and wherein the first controller is configured to elongate a time interval when a display screen displayed on the second display is a screen displaying the animation, the time interval being an interval at which the screen refresh request is to be periodically transmitted to the image processing device.

3. The image processing system according to claim 1, wherein the information processing device further comprises a storage, and wherein, in a case where a display screen displayed on the second display is a screen displaying the animation, the first controller is configured to receive all the plurality of pieces of screen data transmitted by the image processing device at once in response to the screen refresh request, store the plurality of pieces of screen data in the storage, and in a case where an animation same as the animation displayed on the second display is to be displayed on the first display, display an animation using the plurality of pieces of screen data stored in the storage.

4. The image processing system according to claim 3, wherein, when transmitting the plurality of pieces of screen data, the second controller is configured to transmit information indicating that the plurality of pieces of screen data are included.

5. The image processing system according to claim 1, wherein the animation is a blinking image.

6. The image processing system according to claim 1, wherein the animation is a blinking cursor.

7. The image processing system according to claim 1, wherein the animation indicates that the image processing device is in particular operation.

8. An image processing system including an information processing device and an image processing device, wherein the information processing device comprises a first communication interface, a first display, and a first controller, wherein the image processing device comprises a second communication interface, a second display, and a second controller, wherein, in a case where the image processing device and the information processing device are remotely connected through the first communication interface and the second communication interface, the first controller is configured to periodically transmit a screen update request to the image processing device, the screen update request being a request for screen data, the screen data being used to display a virtual same screen on the first display, the virtual same screen being a screen virtually same as a screen displayed on the second display, and receive the screen data transmitted by the image processing device in response to the screen update request, and display, on the first display, the virtual same screen based on the received screen data, wherein, in a case where the image processing device and the information processing device are remotely connected through the first communication interface and the second communication interface, the second controller is configured to in response to receipt of the screen update request from the information processing device, generate the screen data and transmit the generated screen data to the information processing device, and in a case where, after displaying an animation on the second display by selecting images, one by one, from a plurality of still images constituting the animation and displaying the selected images by switching the selected images sequentially, when an animation same as the animation displayed on the second display is to be displayed continuously, after generating a plurality of pieces of screen data used to display the plurality of still images, respectively, stop generating screen data same as the plurality of pieces of screen data, and wherein the animation is a blinking image.

* * * * *